United States Patent
Takamuka et al.

(10) Patent No.: US 6,665,171 B1
(45) Date of Patent: Dec. 16, 2003

(54) ELECTROCHEMICAL CAPACITOR

(75) Inventors: Yoshinori Takamuka, Kyoto (JP); Hideki Shimamoto, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 433 days.

(21) Appl. No.: 09/830,962

(22) PCT Filed: Sep. 13, 2000

(86) PCT No.: PCT/JP00/06239

§ 371 (c)(1), (2), (4) Date: Aug. 8, 2001

(87) PCT Pub. No.: WO01/20698

PCT Pub. Date: Mar. 22, 2001

(30) Foreign Application Priority Data

Sep. 16, 1999 (JP) ............................................. 11-262126

(51) Int. Cl.$^7$ .................................................. H01G 9/04
(52) U.S. Cl. ........................ 361/508; 361/512; 361/516; 361/528; 361/532
(58) Field of Search ................................ 361/508, 512, 361/516, 528, 532

(56) References Cited

U.S. PATENT DOCUMENTS

| | | | | | |
|---|---|---|---|---|---|
| 4,898,766 A | * | 2/1990 | Tamamura et al. | ...... | 428/195.1 |
| 4,959,753 A | * | 9/1990 | Kudoh et al. | ................ | 361/525 |
| 5,019,949 A | * | 5/1991 | Ikeda et al. | .................. | 361/525 |
| 5,098,529 A | * | 3/1992 | Feldhues | .................... | 205/419 |
| 5,243,004 A | | 9/1993 | Funatsu et al. | | |
| 5,429,895 A | | 7/1995 | Lian et al. | | |
| 5,527,640 A | | 6/1996 | Rudge et al. | | |
| 5,696,224 A | | 12/1997 | Benrabah et al. | | |
| 5,754,394 A | * | 5/1998 | Evans et al. | ................. | 361/516 |
| 5,914,852 A | * | 6/1999 | Hatanaka et al. | ............ | 361/523 |
| 6,120,940 A | * | 9/2000 | Poehler et al. | ............... | 429/303 |
| 6,421,227 B2 | * | 7/2002 | Nitoh et al. | ................. | 361/523 |
| 6,466,421 B1 | * | 10/2002 | Monden et al. | ................ | 361/15 |
| 6,473,293 B2 | * | 10/2002 | Shimada et al. | ............. | 361/523 |
| 6,508,846 B2 | * | 1/2003 | Yamada et al. | ............. | 29/25.03 |
| 6,517,892 B1 | * | 2/2003 | Sakai et al. | .................. | 427/80 |
| 6,594,140 B1 | * | 7/2003 | Evans et al. | ................. | 361/516 |

FOREIGN PATENT DOCUMENTS

| | | |
|---|---|---|
| EP | 416567 | 9/1991 |
| EP | 756348 | 1/1997 |
| JP | 61-32509 | 2/1986 |
| JP | 62-237715 | 10/1987 |
| JP | 2-219823 | 9/1990 |
| JP | 4-267056 | 9/1992 |
| JP | 5-178948 | 7/1993 |
| JP | 5-178949 | 7/1993 |
| JP | 6-104141 | 4/1994 |
| JP | 6-220147 | 8/1994 |
| JP | 11-86855 | 3/1999 |
| WO | 96/20504 | 7/1996 |

OTHER PUBLICATIONS

"Electrochemically Active Polymers for Rechargeable Batteries", by Novak et al., Chem. Rev., vol. 97, No. 1 (1997), pp. 207–281.

* cited by examiner

*Primary Examiner*—Bruce F. Bell
(74) *Attorney, Agent, or Firm*—McDermott, Will & Emery

(57) ABSTRACT

An electrochemical capacitor comprising a pair of oxidation-reduction active electrodes and an electrolyte solution or an ion-conductive solid electrolyte between the electrodes, wherein the electrodes contain a specific copolymer, thereby providing the electrochemical capacitor high in energy density and excellent in heat-resistance and charge/discharge cycle features.

6 Claims, No Drawings

ELECTROCHEMICAL CAPACITOR

TECHNICAL FIELD

The present invention relates to an electrochemical capacitor used in a variety of electronic devices.

BACKGROUND ART

An electric double layer capacitor characterized by having a capacitance value between that of a battery and that of a capacitor has been widely used as a DC power source of a small wattage rating to replace a back-up power supply or to serve as an auxilary/alternate cell of a secondary battery for ICs and memories. However, the energy density of electric double layer capacitors available at present is some tenth of the energy density of such secondary batteries as a lead acid storage battery, a nickel hydrogen secondary battery and therefore a much higher energy density has been required of electric double layer capacitors.

On the other hand, the advantages in using an electric double layer capacitor are as follows:

Such environmentally burdening material as lead, cadmium and the like are used in the electrodes of general purpose secondary batteries, whereas electric double layer capacitors use electrodes mainly formed of such carbon materials as activated carbon and the like that are safe and less burdensome on the environment. In addition, electric double layer capacitors utilize electric double layer capacitance created on the interface between an electrode and an electrolyte, not relying on the conversion of a chemical reaction to electric energy like in a storage battery, resulting in a high degree of efficiency at the time of charging/discharging and also a long cycle life.

An electric double layer capacitor comprises a pair of polarizable electrodes, each of which is formed by the steps of applying a slurry comprised of activated carbon, carbon black, a binder and the like onto an electric current collector formed of an aluminum foil and the like to a uniform thickness and finally drying the slurry, disposed opposite to each other with a porous separator, which is impregnated with a corrosion-resistant electrolyte, sandwiched between the polarizable electrodes.

A water-soluble type electrolyte or an organic solvent type electrolyte (a nonaqueous electrolyte) is used as the electrolyte for electric double layer capacitors. However, the withstand voltage of a water-soluble type electrolyte is low (about 1.2 V), resulting in a problem of difficulties to realize electric double layer capacitors with a high energy density. On the other hand, the withstand voltage of a nonaqueous electrolyte ranges from 2.3 V to 3.0 V but the electric conductivity thereof is low when compared with a water-soluble type electrolyte, resulting in a problem of increasing the internal resistance of electric double layer capacitors. In recent years, various studies have been carried out to solve these problems and such inventions as disclosed in the Japanese Patent Application Unexamined Publication Nos. S61-32509 and S62-237715, the International Patent Application Unexamined Publication No. WO96/20504 and the like have been made.

The activated carbon to form electrodes for electric double layer capacitors is prepared by carbonizing at high temperatures such raw materials as coconut husk, sawdust, phenolic resin, petroleum coke, coal coke and the like and thereafter by putting through such treatments as steam-activation, zinc chloride activation, alkali activation and the like. It is generally said that the surface area per unit weight of the activated carbon for electric double layer capacitors is the larger, the higher capacitance per unit weight is allowed to be gained. However, an increase in the surface area per unit weight of the activated carbon results in a decrease in the bulk density thereof, thereby causing a problem of decreasing the energy density per unit volume of electric double layer capacitors.

Further, in order to solve the foregoing problems associated with electric double layer capacitors, such new devices, which have the energy density comparable with that of secondary batteries such as a lead acid storage battery and the like, as an electrochemical capacitor as described in the Japanese Patent Application Unexamined Publication No. H6-104141 and the like have been recently developed and many reports cover such developments. In addition, a π conjugate polymer as described in Chem. Rev. 1997, 97, 207–281 and studied for use in the electrode of secondary batteries is also allowed to be used in an electrochemical capacitor theoretically.

However, even among the foregoing conventional electrochemical capacitors, an electrochemical capacitor with an electrode formed of ruthenium oxide or a composite of ruthenium oxide and other metal oxides realizes a high energy density and excellent cycle characteristics on one hand but on the other hand there is such a problem as the ruthenium used in the electrode being very expensive and the like. An electrochemical capacitor with such conductive polymers having a π conjugate as polypyrrole, polythiophene, polyaniline and the derivatives thereof and the like used as the electrode materials is allowed to realize a high energy density but also has a problem of being inferior to the electric double layer capacitors utilizing activated carbon in terms of heat resistance and cycle characteristics. This is attributed to the heat resistance of a π conjugate type conductive polymer and an irreversible chemical reaction occurring between the electrolyte material needed for an electrochemical capacitor and the π conjugate type conductive polymer. Therefore, an electrode material, which has high heat resistance and does not cause an irreversible chemical reaction with the electrolyte material, is being looked for. Furthermore, it is generally difficult for a π conjugate conductive polymer to be resolved/melted, resulting in a problem of not allowing the electrode for electrochemical capacitors to be produced readily.

The present invention deals with the foregoing problems that have been so far existing and aims at providing an electrochemical capacitor having a high energy density and excelling in heat resistance and charge/discharge cycle characteristics.

SUMMARY OF THE INVENTION

In order to solve the foregoing problems, the present invention discloses an electrochemical capacitor comprising a pair of oxidation-reduction active electrodes and an electrolyte or an ionic conductive solid electrolyte sandwiched between the oxidation-reduction active electrodes, in which the oxidation-reduction active electrode contains a copolymer that has a chemical formula 1 as described below, thereby allowing an electrochemical capacitor having a high energy density and excelling in heat resistance and charge/discharge cycle characteristics to be realized.

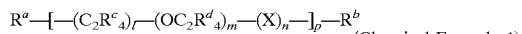
(Chemical Formula 1)

, where $R^a$ and $R^b$ are, respectively, hydrogen, fluorine, an alkyl group with 1 to 15 of carbon, a fluoroalkyl group, an alkenyl group and a fluoroalkenyl group, or a phenyl group, a fluorophenyl group, a sulfone group, an amino group, a nitro group and a cyano group, and $R^a$ and $R^b$ are allowed to be the same with or different from each other.

Also, $R^c$ and $R^d$ are selected from hydrogen, fluorine, an alkyl group with 1 to 15 of carbon, a fluoroalkyl group, an alkenyl group and a fluoroalkenyl group, or a phenyl group, a fluorophenyl group, a sulfone group, an amino group, a nitro group and cyano group, or a chemical formula A, and the respective four $R^c$ and $R^d$ are allowed to be the same with or different from one another.

The chemical formula A is described by a general expression as follows:

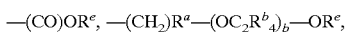

where $R^e$ is hydrogen or an alkyl group, and "a" and "b" are integers of 0 to 20 and allowed to be the same with or different from each other.

In the chemical formula 1, "l" and "m" are integers of 0 or larger and not 0 at the same time, "n" and "p" are natural numbers of 1 or larger. X is any one species, or two or more species out of the chemical species described by a general expression as follows:

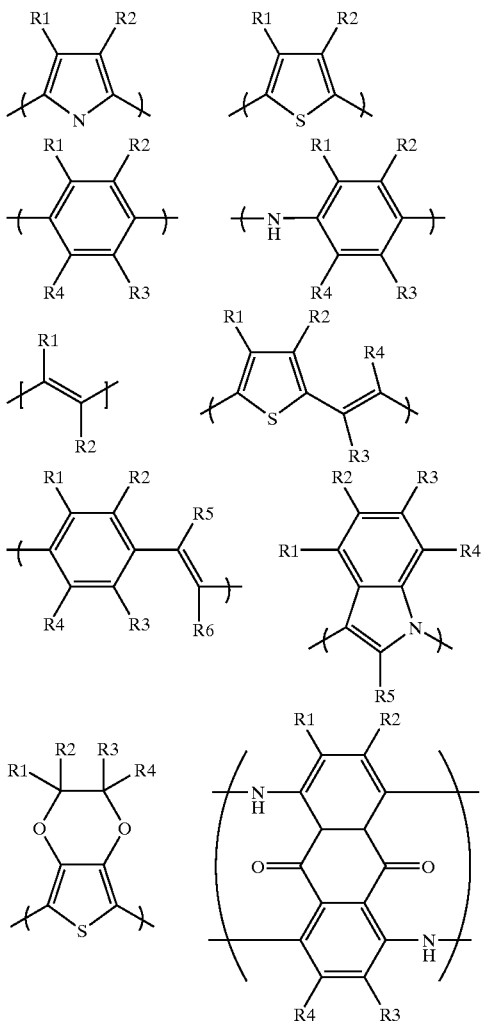

R1 to R6 are, respectively, hydrogen, fluorine, an alkyl group with 1 to 20 of carbon, which is allowed to be replaced with a hydroxyl group, a fluoroalkyl group, an alkenyl group and a fluoroalkenyl group, or a phenyl group, a fluorophenyl group, a sulfon group, an amino group, a nitro group and a cyano group with part or all thereof being allowed to be linked with one another to form rings. Also, R1 to R6 are allowed to be the same with or different from one another.

PREFERRED EMBODIMENTS OF THE INVENTION

An electrochemical capacitor in a first exemplary embodiment of the present invention comprises a pair of oxidation-reduction active electrodes with an electrolyte or an ionic conductive solid electrolyte sandwiched between the oxidation-reduction active electrodes, in which the oxidation-reduction active electrode contains a copolymer expressed by the chemical formula 1. According to the foregoing structure, the copolymerization taking place between a conductive polymer and a polymer with high heat resistance and a powerful affinity for solvent on the electrodes of the electrochemical capacitor allows the electrode material to enhance the heat resistance and cycle characteristics thereof, thereby achieving the effects of a higher energy density in comparison with a prior art electric double layer capacitor employing electrodes formed of activated carbon and also enhanced heat resistance and cycle characteristics when compared with an electrochemical capacitor using electrodes formed of a conductive polymer.

An electrochemical capacitor in a second exemplary embodiment of the present invention is the same as in the first exemplary embodiment except for X in the chemical formula 1 being 3-(4-fluorophenyl) thiophene. The introduction of an electron-withdrawing 4-fluorophenyl group in thiopene realized by the 3-(4-fluorophenyl) thiophene makes it easy for doping and de-doping of electrolyte by cation to be carried out, thereby achieving the effects of realizing an electrochemical capacitor of high capacitance and also excellent cycle characteristics, in particular.

An electrochemical capacitor in a third exemplary embodiment of the present invention is the same as in the first exemplary embodiment except for X in the chemical formula 1 being 3-sulfonylthiophene. According to the foregoing structure, the sulfonyl group of the 3-sulfonylthiophene allows a conductive polymer to be self-doped, thereby particularly reducing the change in electric conductivity of the conductive polymer and achieving the effects of realizing an electrochemical capacitor with a low internal resistance value.

An electrochemical capacitor in a fourth exemplary embodiment of the present invention is the same as in the first exemplary embodiment except for X in the chemical formula 1 being 3,4-disulfonylthiophene. According to the foregoing structure, the sulfonyl group of the 3,4-disulfonylthiophene allows a conductive polymer to be self-doped, thereby particularly reducing the change in electric conductivity of the conductive polymer, further making it easy for the electrolyte to be impregnated in the polymer because of the steric hindrance of two sulfonyl groups and achieving the effects of realizing an electrochemical capacitor with a large capacitance value and also a low internal resistance value.

An electrochemical capacitor in a fifth exemplary embodiment of the present invention is the same as in the first exemplary embodiment except for X in the chemical formula 1 being ethylenedioxithiophene. According to the foregoing structure, the stereoregularity of a conductive polymer is enhanced and the conductive polymer shows excellent electrical conductivity, thereby allowing an electrode formed of ethylenedioxithiophene to be particularly low in resistance and achieving the effects of realizing an electrochemical capacitor with a small internal resistance value.

An electrochemical capacitor in a sixth exemplary embodiment of the present invention is the same as in the first exemplary embodiment except for the oxidation-reduction electrode to be containing at least one or more of oxide of ruthenium, manganese, vanadium, titanium, aluminum, nickel, iron, magnesium and silicon. According to the foregoing structure, a mixture of the oxides and a copolymer of the present invention leads to an increased degree of dispersion of the copolymer in the oxidation-reduction electrode, thereby achieving the effects of realizing an electrochemical capacitor with a large capacitance value and also a low internal resistance value.

Next, a detailed description is given to the exemplary embodiments of the present invention.

As a polar aprotic solvent used in the present invention, there are such cyclic carbonic esters as ethylene carbonate, propylene carbonate, butylene carbonate, vinylene carbonate and the like, such chain carbonic esters as dimethyl carbonate, methylethyl carbonate, diethyl carbonate, methylpropyl carbonate, methylisopropyl carbonate and the like, such cyclic esters as γ-buthyrolactone, γ-valerolactone, 3-methyl-γ-buthyrolactone, 2-methyl-γ-buthyrolactone and the like, such chain esters as methyl formate, ethyl formate, methyl acetate, ethyl acetate, propyl acetate, methyl propionate, methyl butyrate, methyl valerate and the like, such cyclic ethers as 1,4-dioxan, 1,3-dioxolane, tetrahydrofuran, 2-methyltetrahydrofuran, 2-methyl-1,3-dioxolane and the like, such chain ethers as 1,2-dimethoxyethane, 1,2-diethoxyethane, diethyl ether, dimethylether, methylethylether, dipropylether and the like, such sulfur complex compounds as sulfolane and the like and such nitrites as acetonitrile, benzonitrile, butyronitrile and the like.

Also, as the foregoing ester carbonate, such a cyclic ester carbonate as possessing a halogene substitution alkyl as described in the Japanese Patent Application Unexamined Publication No. H9-63644 is allowed to be used in addition to the cyclic ester carbonates enumerated in above. As the cyclic ester carbonates as described above, there are provided monofluoromethylethylene carbonate, difluoromethylethylene carbonate, trifluoromethylethylene carbonate and the like.

In addition, these solvents are allowed to be used alone or by having two or more thereof mixed.

As the electrolyte cation used in the present invention, such quaternary onium ions as tetrabutylammonium, tetraethylammonium, triethylmonomethylammonium, tetrabutylphosphonium, tetraethylphosphonium and the like or the electrolyte cation and the like as described in the International Patent Application Unexamined Publication No. WO95/15572 are allowed to be used.

As the electrolyte anion used in the present invention, such as $ClO_4^-$, $BF_4^-$, $PF_6^-$, $AsF_6^-$, $SbF_6^-$, perfluoroalkanesulfonic acid ion with two or more of carbon, perchloroalkanesulfonic acid ion, perfluoroalkanecarboxylic acid ion, perchloroalkanecarboxylic acid ion, bis (perfluoroalkyl) sulfonylimide ion, tris (perfluoroalkyl) sulfonylmethid ion and the like are used.

As the polymer for gel electrolyte, such as polyethylene oxide, polypropylene oxide, polyvinylidene fluoride, polyacrylonitrile, polytetrafluoroethylene, polyhexafluoropropylene, polymethylmethacrilate and the like are used alone or by having two or more thereof formed as a copolymer.

Next, a description is given to the present invention according to the specific exemplary embodiments but the present invention is not limited in whatever manner by these exemplary embodiments.

Table 1 shows the structures of the first to fifth exemplary embodiments using the electrode materials of the present invention and also prior art examples 1 and 2 as control examples. Table 2 shows capacitance per unit weight and the rate of change of capacitance after 500 hours at 85° C. for the first to fifth exemplary embodiments of the present invention and the prior art examples 1 and 2.

TABLE 1

| | Electrolyte/ Solvent | Electrode Material |
|---|---|---|
| First Exemplary Embodiment | TEAClO$_4$/PC | Polyethylenedioxithiophene/ polystyrene copolymer |
| Second Exemplary Embodiment | TEMAPF$_6$/PC | Poly 3-(4-fluorophenyl) thiophene/polyethylene oxide copolymer |
| Third Exemplary Embodiment | EMIBF$_4$/PC | Poly (5,8-diaminoanthraquinone)/ polyvinylidene fluoride copolymer |
| Fourth Exemplary Embodiment | TEMAClO$_4$/AN | Polyaniline/polyacrylonitrile copolymer |
| Fifth Exemplary Embodiment | TEMAIPNS/AN | Polypyrrole/polypropylene oxde copolymer + manganese dioxide |
| Prior Art Example 1 | TEABF$_4$/PC | Activated carbon |
| Prior Art Example 2 | TEAClO$_4$/PC | 3-(4-fluorophenyl) thiophene |

TEACl$_4$; Perchloric acid tetraethylammonium, TEMAPF$_6$; Phosphorous triethylmethylammonium hexaflouride, EMIBFphd 4; Boric acid 1 - ethyl - 3 methylimidazolium quadflouride, TEMAClO$_4$; Perchloric acid triethylmethylammonium, TEMAIPNS; triethylmethylammonium triisopropylnaphtalenesulfonate, TEABF$_4$; Boric acid tetraethylammonium quadflouride, PC; Propylene carbonate, AN; Acetonitrile

TABLE 2

| | Capacitance (F/g) | Rate of Change of Capacitance (%) |
|---|---|---|
| First Exemplary Embodiment | 35 | −15 |
| Second Exemplary Embodiment | 50 | −17 |
| Third Exemplary Embodiment | 52 | −20 |
| Fourth Exemplary Embodiment | 39 | −15 |
| Fifth Exemplary Embodiment | 42 | −13 |
| Prior Art Example 1 | 20 | −10 |
| Prior Art Example 2 | 60 | −97 |

As clearly seen in Table 2, the electrochemical capacitors in the first to fifth exemplary embodiments of the present invention have large capacitance values per unit weight in comparison with the electrochemical capacitor in the prior art example 1 and show excellent stability at high temperatures when compared with the electrochemical capacitor in the prior art example 2.

INDUSTRIAL APPLICABILITY

As described in above, an electrochemical capacitor of the present invention is allowed to have electrode materials enhanced in heat resistance and cycle characteristics by having the copolymerization between a conductive polymer and a polymer with excellent heat resistance and a powerful affinity for a solvent taken place on the electrode of the electrochemical capacitor, thereby enabling the realization of an electrochemical capacitor with a higher energy density than that of a prior art electric double layer capacitor using activated carbon as the electrode thereof and further with more enhanced heat resistance and cycle characteristics than those of an electrochemical capacitor using a conductive polymer as the electrode thereof.

What is claimed is:

1. An electrochemical capacitor comprising a pair of oxidation-reduction active electrodes with an electrolyte or an ionic conductive solid electrolyte sandwiched between said oxidation-reduction active electrodes, wherein said oxidation-reduction active electrode contains a copolymer expressed by a chemical formula 1; wherein the chemical formula 1 is shown as:

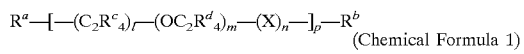

(Chemical Formula 1)

, where $R^a$ and $R^b$ are, respectively, hydrogen, fluorine, an alkyl group with 1 to 15 of carbon, a fluoroalkyl group, an alkenyl group and a fluoroalkenyl group, or a phenyl group, a fluorophenyl group, a sulfone group, an amino group, a nitro group and a cyano group, and $R^a$ and $R^b$ are allowed to be the same with or different from each other; and $R^c$ and $R^d$ are selected from hydrogen, fluorine, an alkyl group with 1 to 15 of carbon, a fluoroalkyl group, an alkenyl group and a fluoroalkenyl group, or a phenyl group, a fluorophenyl group, a sulfone group, an amino group, a nitro group and a cyano group, or a chemical formula A, and said respective four $R^c$ and $R^d$ are allowed to be the same with or different from one another; and the chemical formula A is described by a general expression as follows:

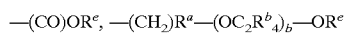

, where $R^e$ is hydrogen or an alkyl group, and "a" and "b" are integers of 0 to 20 and allowed to be the same with or different from each other;

in the chemical formula 1, "l" and "m" are integers of 0 or larger and not 0 simultaneously, and "n" and "p" are natural numbers of 1 or larger;

X is any one species, or two or more species out of chemical species described by a general expression as follows:

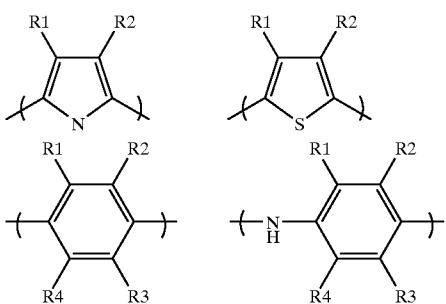

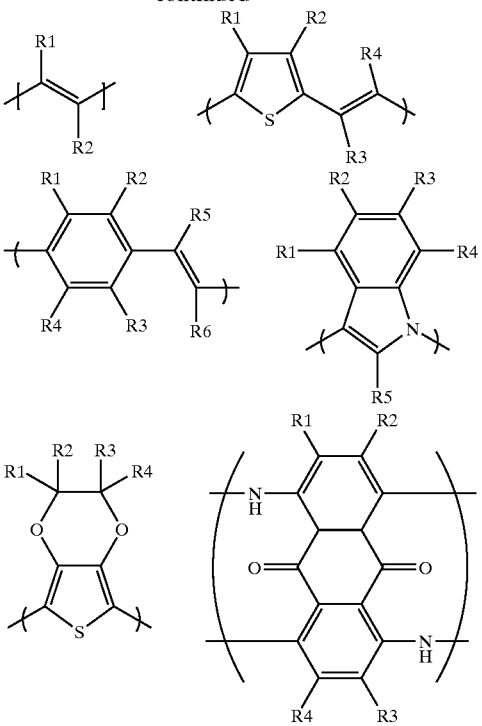

R1 to R6 are, respectively, hydrogen, fluorine, an alkyl group with 1 to 20 of carbon, which is allowed to be replaced with a hydroxyl group, a fluoroalkyl group, an alkenyl group and a fluoroalkenyl group, or a phenyl group, a fluorophenyl group, a sulfon group, an amino group, a nitro group and a cyano group with part or all thereof being allowed to be linked with one another to form rings; and R1 to R6 are allowed to be the same with or different from one another.

2. The electrochemical capacitor according to claim 1, wherein X in the chemical formula 1 is 3-(4-fluorophenyl)thiophene.

3. The electrochemical capacitor according to claim 1, wherein X in the chemical formula 1 is 3-sulfonylthiophene.

4. The electrochemical capacitor according to claim 1, wherein X in the chemical formula 1 is 3,4-disulfonylthiophene.

5. The electrochemical capacitor according to claim 1, wherein X in the chemical formula 1 is ethylenedioxithiophene.

6. The electrochemical capacitor according to claim 1, wherein said oxidation-reduction electrode contains at least one or more selected from a group of oxides of ruthenium, manganese, vanadium, titanium, aluminum, nickel, iron, magnesium and silicon.

* * * * *